(12) United States Patent
Morita

(10) Patent No.: US 11,949,260 B2
(45) Date of Patent: *Apr. 2, 2024

(54) POWER SUPPLY SYSTEM

(71) Applicant: DENSO CORPORATION, Kariya (JP)

(72) Inventor: Tetsuo Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 448 days.

This patent is subject to a terminal disclaimer.

(21) Appl. No.: 17/226,246

(22) Filed: Apr. 9, 2021

(65) Prior Publication Data
US 2021/0320506 A1 Oct. 14, 2021

(30) Foreign Application Priority Data
Apr. 9, 2020 (JP) .................... 2020-070354

(51) Int. Cl.
*H02J 7/00* (2006.01)
*B60R 16/03* (2006.01)
*H02H 3/08* (2006.01)
*H02J 7/14* (2006.01)

(52) U.S. Cl.
CPC ............ *H02J 7/0024* (2013.01); *B60R 16/03* (2013.01); *H02H 3/08* (2013.01); *H02J 7/1423* (2013.01)

(58) Field of Classification Search
CPC ...................................................... H02J 7/0024
USPC ........................................................... 320/117
See application file for complete search history.

(56) References Cited

U.S. PATENT DOCUMENTS

| 11,505,144 | B2 * | 11/2022 | Morita | ................... H02H 3/16 |
| 2019/0123545 | A1 | 4/2019 | Maekawa et al. | |
| 2020/0216002 | A1 | 7/2020 | Mazaki et al. | |
| 2020/0313457 | A1 * | 10/2020 | Kozuki | ................. H02J 7/0047 |
| 2021/0316679 | A1 * | 10/2021 | Morita | ................. B60R 16/033 |

* cited by examiner

*Primary Examiner* — Yalkew Fantu
(74) *Attorney, Agent, or Firm* — Oliff PLC

(57) ABSTRACT

An inductance component has a given value causing a time constant of a circuit composed of one of first and second routes in which an abnormality does not occur and a connection path connecting the first and second routes not to allow a voltage of one of loads disposed in the other one of the routes to decrease to less than a lower limit of an operating voltage of one of loads during a shut-off period, which starts from a time when it is determined by an abnormality determiner that an abnormality has occurred in any one of the first route and the second route to a time when an inter-route switch enters a switched off state upon receiving a switch-off command from a state controller.

6 Claims, 6 Drawing Sheets

POWER SUPPLY SYSTEM

CROSS-REFERENCE TO RELATED APPLICATION

This patent application is based on and claims priority to Japanese Patent Application No. 2020-070354, filed on Apr. 9, 2020 in the Japan Patent office, the entire disclosure of which is hereby incorporated by reference herein.

BACKGROUND

Technical Field

The present disclosure relates to a power supply system.

Related Art

A power supply system recently used in vehicles can control behavior of the vehicle. In such a power supply system, however, when an abnormality occurs in a load performing an essential function to drive the vehicle, such as an electric brake, an electric steering device, etc., the function is entirely lost thereby stopping the vehicle. To avoid the entire loss of function during driving of the vehicle when such an abnormality occurs, a conventional route employs redundant first and second loads that perform one (common) function.

For example, a conventional power supply system has a first route including a first power supply connected to a first load and a second route including a second power supply connected to a second load. Further, an inter-route switch is disposed in a connection path connecting these routes with each other. The inter-route switch is switched off when it is determined by a controller that an abnormality has occurred in one of these routes. With this, one of the first and second loads disposed in an applicable one of the first and second routes operating normally continuously drives the vehicle thereby securing functions necessary for driving the vehicle.

However, a given shut-off period is required before the inter-route switch enters a switched off state after it is determined by the controller that the abnormality has occurred. Hence, if a voltage of one of the first and second loads in applicable one of the routes where an abnormality does not occur decreases below a lower limit of an operating voltage thereof during the shut-off period, operation of one of the first and the second loads is highly likely to be stopped.

Hence, the present disclosure has been made to address the above-described problem and it is an object of the present disclosure to provide a novel power supply system capable of enabling a load to continuously operate even when an abnormality occurs.

SUMMARY

Accordingly, one aspect of the present disclosure provides a novel power supply system that comprises a first route including a first power supply connected to a first load; a second route including a second power supply connected to a second load, and a first connection path connecting the first and second routes with each other. The connection path includes: an inter-route switch disposed in the connection path, and an inductance having a given inductance component connected in series to the inter-route switch. The power supply system also comprises an abnormality determiner that determines if an abnormality has occurred in any one of the first route and the second route; and a state controller that outputs a switch-off command to the inter-route switch when it is determined by the abnormality determiner that an abnormality has occurred. The inductance component has a given value causing a time constant of a circuit composed of one of the routes in which the abnormality does not occur and the connection path not to allow a voltage of one of the loads disposed in the other one of the routes to decrease to less than a lower limit of an operating voltage of the one of the first and second loads during a shut-off period. The shut-off period starts from a time when it is determined by the abnormality determiner that an abnormality has occurred in any one of the first route and the second route to a time when the inter-route switch enters a switched off state upon receiving the switch-off command from the state controller.

With the above-described system, since the inter-route switch is disposed in the connection path connecting the first and second routes with each other, power can be mutually supplied between the first and second routes when it is switched on. Accordingly, power can be redundantly supplied to the first load and the second load from the first power supply and the second power supply. Further, when it is determined that an abnormality has occurred in one of the routes, a load disposed in the other one of the routes where an abnormality has not occurred can be continuously operated by switching off the inter-route switch.

However, a given shut-off period is required before the inter-route switch enters the switched off state after it is determined that the abnormality has occurred. Hence, if a voltage of a load disposed in a route where an abnormality does not occur decreases below a lower limit of an operating voltage during the shut-off period, operation of the load is highly probably stopped.

However, according to one aspect of the present disclosure, an inductance is connected in series to the inter-route switch in the connection path. Further, a time constant of a circuit composed of the other one of the first and second routes and the connection path is designed to satisfy a condition that a voltage of a load disposed in the other one of the first and second routes does not decrease to less than the lower limit of the operating voltage during the shut-off period. That is, even if the abnormality occurs in one of the first and second routes, the power supply system generates a transitional difference in voltage between the first and second routes based on a transitional change in current caused by the abnormality and the inductance component of the inductance so as not to cause the voltage of the load disposed in the other one of the first and second routes to decrease to less than the lower limit of the operating voltage thereof. With this, the load disposed in the other one of the first and second routes can be continuously operated.

Here, in general, a resistor having a given resistance value can be disposed in the connection path to generate a transitional difference in voltage (in the resistor) based on a transitory change in current caused by the abnormality and the resistance value of the resistor. However, when the resistor is disposed in the connection path, a voltage difference always occurs between these routes even in a normal time where no abnormality occurs, thereby causing a power loss. However, according to one aspect of the above-described system, generation of the voltage difference between the routes and corresponding power loss during the normal time can be either reduced or suppressed by providing the inductance in the connection path.

According to another aspect of the present disclosure, the novel power supply system comprises a bypass path to bypass the inductance. The bypass path connects the first and second routes with each other to bypass the inductance. The bypass path includes a second inter-route switch.

Hence, according to another aspect of the present disclosure, a bypass path that bypasses the inductance is disposed in the connection path, and a second inter-route switch is disposed in the bypass path. Hence, by switching on the second inter-route switch, the first and second routes are enabled to connect to each other by bypassing the inductance. Hence, when power is mutually supplied between the first and second routes during a normal time, i.e., no abnormality has occurred, delay in fluctuation of a voltage generally caused by the inductance value of the inductance can be reduced or suppressed in each of the loads.

According to yet another aspect of the present disclosure, the first load and the second load perform at least one common driver assistance function of assisting a moving body necessary for operation of the moving body. The moving body is enabled to run in a first mode using the driving assistance function and a second mode not using the driving assistance function. The state controller outputs a switch-on command to the first inter-route switch and a switch-off command to the second inter-route switch in the first mode. The state controller outputs a switch-on command to at least the second inter-route switch thereby allowing the first route and the second route to have electrical continuity to each other through the bypass path in the second mode.

In general, among power supply systems applied to a moving body having a first load and a second load which perform necessary functions for operating the moving body and assisting a driver, some systems can switch a running mode between a first mode in which a driver assistance function is utilized and a second mode in which the driver assistance function is not utilized. In view of this, according to yet another aspect of the present disclosure, the switch-on command is output to the first inter-route switch and the switch-off command is output to the second inter-route switch in the first mode. Hence, the first route and the second route can be connected with each other via the inductance, and accordingly, even if an abnormality occurs in any one of the routes, power supply can be secured in the other one of the routes where an abnormality has not occurred, thereby enabling continuous usage of the driver assistance function.

Further, in the second mode, the switch-on command is output at least to the second inter-route switch, thereby electrically connecting the first route and the second route with each other through the bypass path. Hence, the first route and the second route can be connected with each other without intervention of the inductance, thereby reducing or suppressing a delay in fluctuation of a voltage in each of the loads during a normal time, i.e., when no abnormality has occurred. That is, an operation delay in the second mode can be reduced or suppressed while reducing or suppressing the power loss in the first mode.

According to yet another aspect of the present disclosure, the state controller outputs a switch-off command to the first route inter switch when it is determined by the abnormality determiner that an abnormality has occurred in the first mode. According to yet another aspect of the present disclosure, a loss of power supply can be preferably inhibited when the driver assistance function is used.

According to yet another aspect of the present disclosure, the state controller outputs a switch-off command to the first inter-route switch and the second inter-route switch when it is determined by the abnormality determiner that an abnormality has occurred in the second mode.

This is because, the first route and the second route are electrically connected with each other without intervention of the reactor 38 in the second mode. In such a situation, even if a switch-off command is output to each of the first inter-route switch and the second inter-route switch when it is determined that an abnormality has occurred in the second mode, a voltage of the load in the other one of the routes unavoidably decreases to lower than a lower limit of an operating voltage of the load during the shut-off period. However, according to yet another aspect of the present disclosure, the driver assistance function is not used in the second mode. Hence, when the voltage of the load in the other one of the routes decreases to lower than the lower limit of the operating voltage of the load during the shut-off period, a driver can drive the moving body continuously. When the shut-off period ends, the moving body can be continuously operated by the load in the other one of the routes where no abnormality has occurred.

According to yet another aspect of the present disclosure, the bypass path bypasses the first inter-route switch and the inductance. The bypass path is enabled to allow a dark current to be supplied to the second route side via the second inter-route switch in a route hibernation state.

Hence, according to yet another aspect of the present disclosure, the second inter-route switch remains in a switched-on state when operation of the power supply system is suspended (i.e., in an operation suspended state), and accordingly, a dark current can be supplied to the second route via the second inter-route switch. In addition, when the power supply system is operated (i.e., in an operation condition), the first and second routes are connected with each other by using the bypass path without intervention of the inductance to supply the dark current. Hence, it is not necessary to provide a separate path for connecting the first and second routes with each other by bypassing the inductance separately from the path used in supplying the dark current. Hence, a configuration of the power supply system can be simplified.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
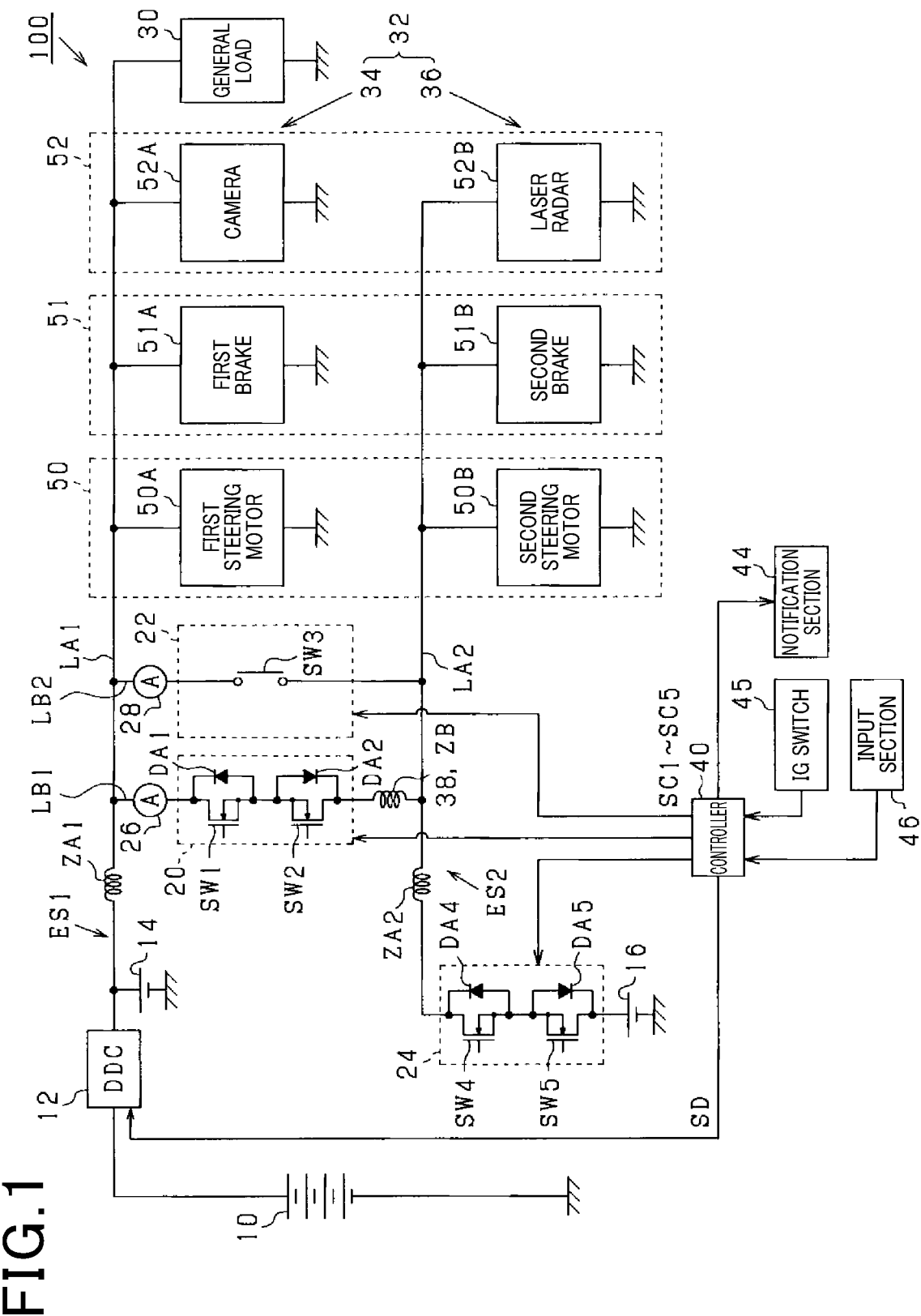
FIG. 1 is a diagram illustrating an overall structure of an exemplary power supply system according to one embodiment of the present disclosure.

Referring now to the drawings, wherein like reference numerals designate identical or corresponding parts throughout the several views thereof, and to FIG. 1, a power supply system 100 is illustrated and is configured to supply power to a general load 30 and a specific load 32. The power supply system 100 includes a high-voltage secondary battery 10, a DC-DC (Direct Current to Direct Current) converter (hereinafter, simply referred to as a converter) 12, and a first low-voltage secondary battery 14. The power supply system 100 also includes a second low-voltage storage battery 16, a first switch unit 20, and a second switch unit 22. The power supply system 100 further includes a third switch unit 24 and a controller 40.

The high-voltage secondary battery 10 has a rated voltage (for example, several hundred volts) higher than rated voltages of the first low-voltage secondary battery 14 and the second low-voltage secondary battery 16. The high-voltage secondary battery may be composed of a lithium-ion secondary battery. The converter 12 converts electric power supplied from the high-voltage storage battery 10 into electric power to provide operating voltages VM (for example, 12V) operating the general load 30 and the specific load 32. The converter 12 then supplies conversion results to the general load 30 and the specific load 32, respectively.

The general load 30 is an electrical load (hereinafter, simply referred to as a load), such as an air conditioner, an audio device, a power window, etc., not used in assisting a driver driving a vehicle as a moving body.

By contrast, the specific load 32 is a load that performs at least one function to assist a driver to drive a vehicle. Specifically, the specific load 32 performs a driver assistance function for a vehicle and includes an electric power steering device 50 that controls steering of the vehicle, an electric brake 51 that provides braking force to wheels, and a running controller 52 that monitors conditions around the vehicle or the like.

Hence, when an abnormality occurs in any one of these specific loads 32 and a function thereof is entirely lost, the driver assistance cannot be provided. In view of this, to prevent the function from being entirely lost when the abnormality occurs, the specific load 32 is redundantly composed of a first load 34 and a second load 36 per function). Specifically, the electric power steering device 50 has a first steering motor 50A and a second steering motor 50B. The electric brake 51 includes a first brake 51A and a second brake 51B. The running controller 52 has a camera 52A and a laser radar 52B. Hence, each of the first steering motor 50A, the first brake 51A, and the camera 52A corresponds to the first load 34. Also, each of the second steering motor 50B, the second brake 51B, and the laser radar 52B corresponds to the second load 36 in this embodiment.

Hence, the first load 34 and the second load 36 cooperatively realize one function. However, each of the first and second loads 34 and 36 is enabled to partially realize the function alone (i.e., separately). For example, with both the first steering motor 50A and the second steering motor 50B, the electric power steering device 50 can freely steer the vehicle on the one hand. On the other hand, although a steering speed and a steering range or the like are limited to a certain degree, these steering motors 50A and 50B can separately (i.e., independently) realize steering of the vehicle.

Hence, each of the specific loads 32 realizes a function to assist a driver who manually controls driving. Also, each of the specific loads 32 realizes functions necessary for autonomous driving that autonomously controls behavior of a vehicle, such as running, stopping, etc. Accordingly, each of the specific loads 32 can also be regarded as a load that performs at least one of the functions necessary for driving the vehicle.

Further, each of the first loads 34 is connected to the converter 12 via the first route inner path LA1. The first low-voltage storage battery 14 and the general load 30 are also connected to the first route inner path LA1. The first low-voltage storage battery 14 is, for example, composed of a lead-acid battery. Hence, according to this embodiment, the converter 12, the first low-voltage storage battery 14, the general load 30, and the first load 34 are connected with each other by the first route inner path LA1 and collectively constitute a first route ES1. Further, as shown, the first route inner path LA1 also includes an inductance component ZA1 for the first route ES1. Hence, according this embodiment of the present disclosure, the converter 12 and the first low-voltage storage battery 14 collectively correspond to (act as) a first power supply in this embodiment.

Further, each of the second loads 36 is connected to the second low-voltage storage battery 16 via the second route inner path LA2. The second low-voltage storage battery 16 is, for example, composed of a lithium-ion secondary battery. Hence, according to this embodiment, the second low-voltage storage battery 16 and the second loads 36 are connected with each other by the second route inner path LA2 and collectively constitute a second route ES2. Further, as shown, the second route inner path LA2 also includes an inductance component ZA2 for the second route ES2. Hence, according to one embodiment of the present disclosure, the second low-voltage storage battery 16 corresponds to (acts as) a second power supply in this embodiment.

Further, a first switch unit 20 is disposed in the first connection path LB1 that connects the first and second route inner paths LA1 and LA2 with each other. The first switch unit 20 includes a first switch SW1 and a second switch SW2 serially connected with each other. In the first switch unit 20, the first switch SW1 is disposed closer to the first route ES1 than the second switch SW2 is. Hence, according to one embodiment of the present disclosure, the first switch SW1 and the second switch SW2 collectively correspond to (act as) a first inter-route switch in this embodiment.

Further, in this embodiment, each of the first and second switches SW1 and SW2 is composed of an N-channel MOSFET (Metal-Oxide-Semiconductor Field-Effect Transistor) (hereinafter, simply referred to as a MOSFET). Hence, a first parasitic diode DA1 is connected parallel to the first switch SW1. A second parasitic diode DA2 is also connected parallel to the second switch SW2. In this embodiment, the first and second switches SW1 and SW2 are connected in series with respective directions of the first and second parasitic diodes DA1 and DA2 being opposite to each other. Specifically, an anode of the first parasitic diode DA1 is disposed closer to the second route ES2 than a cathode thereof is, and the cathode is disposed closer to the first route ES1 than the anode is, respectively. Similarly, an anode of the second parasitic diode DA2 is disposed closer to the first route ES1 than a cathode thereof is, and the cathode thereof is disposed closer to the second route ES2 than the anode is, respectively.

Further, a first current detector 26 is disposed in the first connection path LB1. The first current detector 26 is disposed in the connection path LB1 closer to the first route ES1 than to the first switch unit 20 is. The first current detector 26 detects a magnitude and a direction of an inter-route current IA (see FIG. 3) flowing through the connection path LB1.

The second switch unit 22 is disposed in a second connection path LB2 through which the routes are connected with each other. The second connection path LB2 connects the first route inner path LA1 and the second route inner path LA2 with each other separately from the first connection path LB1. The second switch unit 22 includes a third switch SW3. That is, each of the first switch unit 20 and the second switch unit 22 is connected to the first route inner path LA1 and the second route inner path LA2 at both ends thereof and is disposed in parallel to each other.

In this embodiment, the third switch SW3 employs a mechanical relay of a normally closed type. Hence, a switching speed at which the third switch SW3 is switched between switched on and off states is slower than that at which each of the first and second switches SW1 and SW2 is switched between switched on and off states. However, a parasitic diode is not present in the third switch SW3.

Further, a second current detector 28 is also disposed in the second connection path LB2. The second current detector 28 is disposed in a portion of the second connection path LB2 closer to the first route ES1 than the second switch unit 22 is. The second current detector 28 detects an amount and a direction of an inter-route current IA flowing through the portion of the second connection path LB2. Hence, respective detection values of the current detectors 26 and 28 are input to the controller 40.

Further, the third switch unit 24 is disposed in the second route internal path LA2. Specifically, the third switch unit 24 is disposed in the second route inner path LA2 between any one of connection points respectively connecting to the first and second connection paths LB1 and LB2 and the second low-voltage storage battery 16. The third switch unit 24 includes a fourth switch SW4 and a fifth switch SW5 serially connected with each other. In the third switch unit 24, the fourth switch SW4 is disposed closer to the first and second connection paths LB1 and LB2 than the fifth switch SW5 is.

Further, the fourth and fifth switches SW4 and SW5 of this embodiment are composed of MOSFETs (Metal Oxide Semiconductor Field Effect Transistors), respectively. Hence, a fourth parasitic diode DA4 is connected in parallel to the fourth switch SW4. A fifth parasitic diode DA5 is also connected in parallel to the fifth switch SW5. The fourth and fifth switches SW3 and SW4 are connected in series with directions of the fourth and fifth parasitic diodes DA4 and DA5 being opposite to each other in this embodiment. More specifically, an anode of the fourth parasitic diode DA4 is disposed closer to the second low-voltage storage battery 16 than a cathode thereof is, and the cathode is disposed closer to the first and second connection paths LB1 and LB2 than the anode is. By contrast, an anode of the fifth parasitic diode DA5 is disposed closer to the first and second connection paths LB1 and LB2 than a cathode thereof is. The cathode of the fifth parasitic diode DA5 is disposed closer to the second low-voltage storage battery 16 than the anode thereof is.

Further, the controller 40 disposed in the power supply system generates first to fifth switching signals SC1 to SC5 based on detection values detected by the current detectors 26 and 28 to switch a state of each of the first to fifth switches SW1 to SW5. The controller 40 then outputs commands composed of the first to fifth switching signals SC1 to SC5 to the first to fifth switches SW1 to SW5, respectively. The controller 40 also generates a control signal SD to control the converter 12 and outputs a command composed of the control signal SD to the converter 12.

Hence, a state of the converter 12 is switched by the control signal SD between an operating state and an operation stopped state.

Further, the controller 40 is connected to a notification section 44, an IG (Ignition) switch 45 and an input section 46, and controls these devices. The notification section 44 visually or audibly provides a notification to a driver, and is composed of, for example, a display or a speaker and the like installed in a vehicle interior. The IG switch 45 acts as a vehicle starting switch. Hence, the controller 40 monitors a switched on and off state of the IG switch 45. Further, the input section 46 accepts various operations from the driver and includes, for example, a handle, a lever, and a button. The input section 46 also includes a pedal and a voice input device or the like.

Further, the controller 40 manually and autonomously drives a vehicle by using the above-described specific loads 32. Hence, the controller 40 includes a well-known microcomputer composed of a CPU (Central Processing Unit), a ROM (Read Only Memory), and a RAM (Random Access Memory). The controller 40 also includes a flash memory or the like. With this, the CPU realizes various functions for the manual driving and the autonomous driving with reference to arithmetic program and control data stored in the ROM.

Here, manual driving represents driving in which the vehicle is driven and controlled by operation of a driver. By contrast, autonomous driving represents driving in which the vehicle is driven and controlled by the controller 40 without operation by the driver. Specifically, autonomous driving is ranked at level three or higher among levels zero to five of an autonomous driving level specified by the National Highway Traffic Safety Administration (NHTSA) of USA. More specifically, the level three represents a level at which the controller 40 can control both wheel steering operation and acceleration and deceleration while monitoring a running environment.

Further, the controller 40 is also enabled to perform a driving assistance function, such as LKA (Lane Keeping Assistance), LCA (Lane Change Assistance), PCS (Pre-Crash Safety), etc., by using the above-described specific loads 32. Further, the controller 40 can switch a driving mode of a vehicle between a first mode in which a driver assistance function is used and a second mode in which the driver assistance function is not used, so that the vehicle can run in each of the driving modes. Specifically, the controller 40 switches a mode between the first mode and the second mode based on a switching instruction transmitted from a driver via the input section 46. Here, the first mode includes a mode in which the driver manually drives the vehicle using the driver assistance function, and a mode in which the vehicle is autonomously driven. The second mode is a mode in which the driver manually drives the vehicle without using the driver assistance function.

Hence, when a vehicle runs in the first mode, the controller 40 determines whether an abnormality has occurred in any one of the first route ES1 and the second route ES2. When the controller 40 concludes that no abnormality has occurred in each of the routes ES1 and ES2, autonomous driving and driving assistance are performed in a vehicle by using the first loads 34 and the second loads 36. With this, a first load 34 and a corresponding second load 36 cooperate with each other to achieve one function necessary for the autonomous driving and the driving assistance. Here, in this embodiment, the abnormality represents a power supply loss, such as a ground fault, a wire break, etc.

By contrast, when it is determined that an abnormality has occurred in any one of the routes ES1 and ES2, the first to third switches SW1 to SW3 are switched off, thereby electrically isolating the first route ES1 and the second route ES2 from each other. Hence, even if the abnormality occurs in any one of the routes ES1 and ES2, one of loads 34 and 36 of the other one of the routes ES1 and ES2 in which the abnormality does not occur can be operated.

Further, a given shut-off period TS (see FIG. 3) is required until the first to third switches SW1 to SW3 are switched off after it is determined that an abnormality has occurred in any one of the routes ES1 and ES2. Hence, in such a situation, when a voltage of one of the loads 34 and 36 in the other one of the routes ES1 and ES2 in which the abnormality does not occur decreases to less than a lower limit Vth (see FIG. 3) of an operating voltage VM of one of the loads 34 and 36 during the shut-off period TS, one of the loads 34 and 36 cannot be continuously operated.

In such a situation, the shut-off period TS can be shortened by switching off the third switch SW3 that switches a state at a relatively slower switching speed in the first mode. However, even with the first and second switches SW1 and SW2 which switch a state at a relatively fast switching speed, a given shut-off period TS is required until the first and second switches SW1 and SW2 are switched off. Hence, a technology capable of continuously operating one of the loads 34 and 36 disposed in the other one of the routes ES1 and ES2 even when an abnormality occurs in any one of the routes ES1 and ES2 is needed.

Hence, in this embodiment, a reactor 38 is connected in series to the first switch unit 20 in the first connection path LB1, and an inductance component ZB of the reactor 38 is determined as follows. Specifically, the inductance component ZB of the reactor 38 is designated to allow a time constant TM (see FIG. 3) of a circuit composed of the other one of the routes ES1 and ES2 and the first connection path LB1 to meet a condition that a voltage of one of the loads 34 and 36 disposed in the other one of the routes ES1 and ES2 does not decrease to less than a lower limit Vth of an operating voltage VM.

Herein below, a period from when an abnormality occurs in any one of the routes ES1 and ES2 to when a voltage of one of the loads 34 and 36 disposed in the other one of the routes ES1 and ES2 is lowered less than a lower limit Vth of an operating voltage VM is assumed to be (i.e., represented by) a decreasing period TL (see FIG. 3). Further, a period from when an abnormality occurs to when it is determined that the abnormality has occurred is assumed to be (i.e., represented by) a determination period TD (see FIG. 3). Further, the inductance component ZB of the reactor 38 is adjusted to have a given a value that causes a time constant TM identified by one of the inductance components ZA1 and ZA2 of one of the other routes ES1 and ES2 and the inductance component ZB of the reactor 38 to satisfy the below described first equation.

$$TL > TD + TS \quad \text{(First equation)}$$

Then, in this embodiment, when it is determined that an abnormality has occurred in any one of the routes ES1 and ES2, a control process of switching off the first and second switches SW1 and SW2 is performed. With this, even if an abnormality occurs in any one of the routes ES1 and ES2, one of the loads 34 and 36 disposed in the other one of the routes ES1 and ES2 can be continuously operated. Accordingly, in this embodiment, the reactor 38 corresponds to (acts as) an inductance in this embodiment.

Further, the reactor 38 is disposed in the first connection path LB1 closer to the second route ES2 than the first switch unit 20 is. Hence, the second connection path LB2 connects the first route inner path LA1 and the second route inner path LA2 with each other by bypassing the first switch unit 20 and the reactor 38. Hence, according to this embodiment, the second connection path LB2 corresponds to (i.e., acts as) a bypass path, and the third switch SW3 corresponds to (i.e., acts as) a second inter-route switch in this embodiment.

Figure 2:
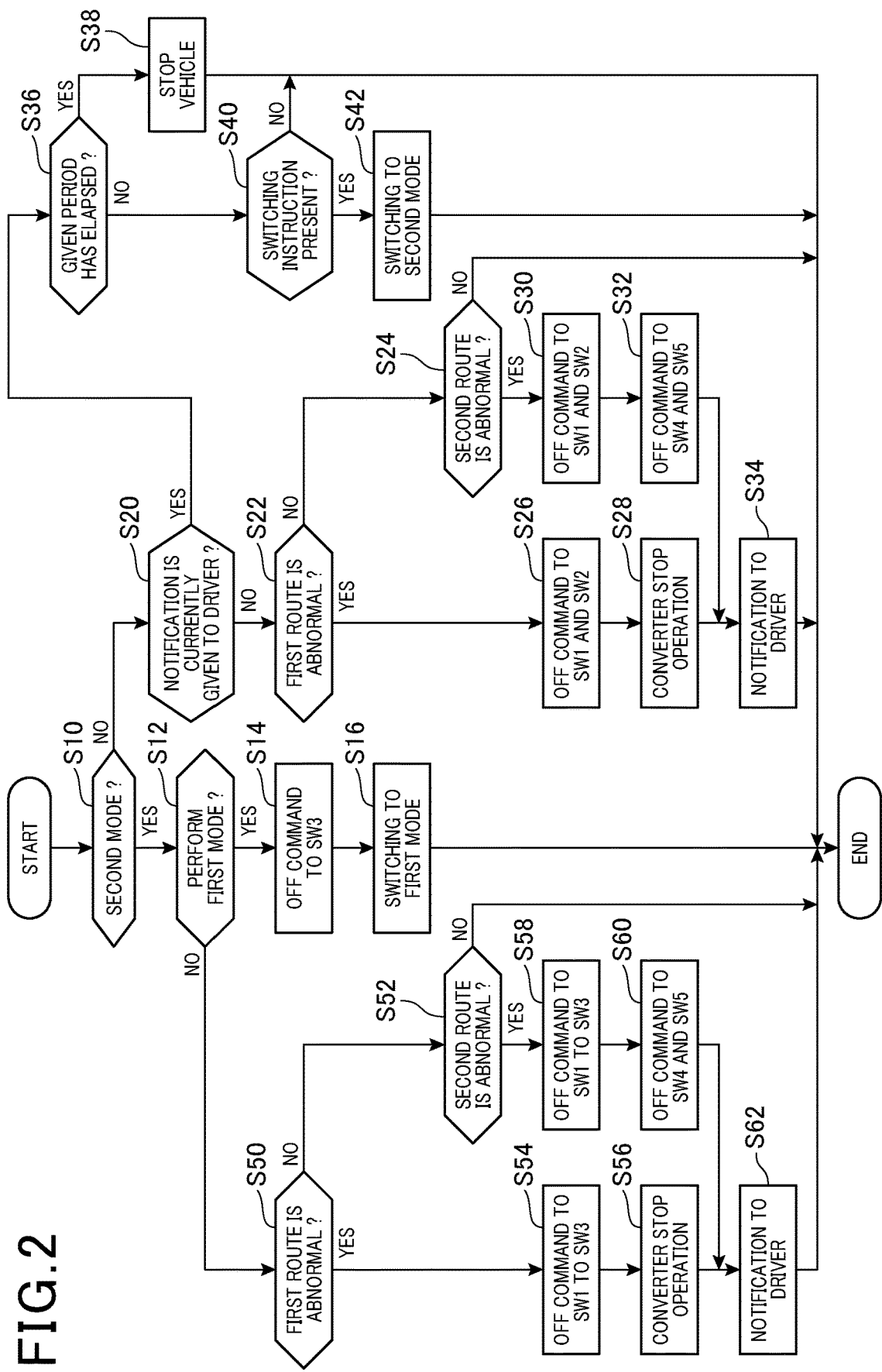
FIG. 2 is a flowchart illustrating an exemplary sequence of a control process according to one embodiment of the present disclosure.

Now, an exemplary control process performed according to one embodiment of the present disclosure is described with reference to FIG. 2. That is, FIG. 2 is a flowchart illustrating the exemplary control process (i.e., control sequence). As shown, when the IG switch 45 is switched to a switched-on state (i.e., closed state), a control process is repeatedly performed in a given control cycle. At a beginning of switching a state of the IG switch 45 to an on-state, a mode of the vehicle is the second mode, and the first to third switches SW1 to SW3 are switched on.

When the control process is started, it is initially determined whether a driving mode of a vehicle is a second mode in step S10. When a determination in step S10 is positive, that is, the driving mode of the vehicle is the second mode, it is further determined whether the vehicle is to be run in the first mode in step S12. For example, when an abnormality occurs in any one of the first route ES1 and the second route ES2, since a precondition for performing the first mode is not established, a negative determination is made in step S12 and the process proceeds to steps S50 and S52.

By contrast, when a switching instruction of switching a mode to the first mode is provided from a driver and the above-described abnormality has not occurred, since the precondition for performing the first mode is established, a positive determination is made in step S12. In such a situation, a switch-off command is output to the third switch SW3 in step S14. Subsequently, in step S16, a driving mode of the vehicle is switched from the second mode to the first mode, thereby terminating the control process. Here, the driving mode is switched to the first mode, for example, when a driver inputs a switching instruction, such as an instruction of performing autonomous driving, an instruction indicating a usage of a driver assistance function, etc., via the input section 46.

By contrast, when the determination in step S10 is negative, that is, when the driving mode of the vehicle is the first mode, it is then determined in step S20 whether a driver is on the way of (i.e., currently) receiving a driver notification. Here, the driver notification is a notification that informs the driver that an abnormality has occurred in any one of the first route ES1 and the second route ES2 and accordingly the first mode is stopped to encourage the driver to switch the driving mode to the second mode.

Further, when the negative determination is made in step S20, it is then determined in respective steps S22 and S24 if an abnormality has occurred in any one of the first route ES1 and the second route ES2. Specifically, in step S22, it is determined whether an abnormality has occurred in the first route ES1. When a negative determination is made in step S22, it is then determined whether an abnormality has occurred in the second route ES2 in step S24.

When it is determined that no abnormality has occurred in each of the routes ES1 and ES2, a negative determination is made in step S24. In such a situation, the control process is terminated, and the vehicle is continuously driven in the first mode.

By contrast, when it is determined that an abnormality has occurred in any one of the routes ES1 and ES2, a switch-off command is output to each of the first and second switches SW1 and SW2, thereby stopping power supply to one of the routes where the abnormality has occurred. Specifically, when a positive determination is made in step S22, a switch-off command is initially output to each of the first and second switches SW1 and SW2 in step S26. Subsequently, a command of switching a state of the converter 12 to an operation stop state is output in step S28. As a result, power is stopped supplying from each of the high-voltage storage battery 10 and the second low-voltage storage battery 16 to the first load 34.

Further, when a positive determination is made in step S24, a switch-off command is initially output to each of the first and second switches SW1 and SW2 in step S30. Subsequently, a switch-off command is output to each of the fourth switch SW4 and the fifth switch SW5 in step S32. With this, the power supply from each of the high-voltage storage battery 10 and the first and second low-voltage storage batteries 14 and 16 to the second load 36 is stopped.

That is, when it is determined that an abnormality has occurred in any one of the routes ES1 and ES2, each of the first and second switches SW1 and SW2 is initially brought to the off state (i.e., open state), and power supplied to one of the loads 34 and 36 located in an applicable one of the routes where no abnormality has occurred is secured. Subsequently, power supply is stopped from each of the high-voltage storage battery 10 and the second low-voltage storage battery 16 in order to inhibit these storage batteries 10 and 16 from overly discharging.

Here, an occurrence of an abnormality can be determined by detecting an amount and a direction of an inter-route current IA by using the first current detector 26. For example, when a ground fault occurs in the first route ES1, an inter-route current IA detected by the first current detector 26 flows in a direction from the second route ES2 to the first route ES1. At the same time, an amount of the inter-route current IA detected by the first current detector 26 is greater than an upper limit Ith (see FIG. 3) of a normal current range. Further, when a ground fault occurs in the second route ES2, an inter-route current IA detected by the first current detector 26 flows in a direction from the first route ES1 to the second route ES2. At the same time, an amount of the inter-route current IA detected by the first current detector 26 is greater than the upper limit Ith of the normal current range. Hence, the controller 40 can identify one of the routes ES1 and ES2 where an abnormality has occurred based on the amount and the direction of the inter-route current IA detected by the first current detector 26.

Subsequently, in step S34, it is notified to the driver via the notification section 44 that the first mode should be terminated (i.e., suspended), thereby terminating the control process.

By contrast, when a positive determination is made in step S20, that is, the driver is receiving the notification, it is then determined in step S36 whether a given time has elapsed after the driver is notified in step S34. Here, the given period is previously designated based on a storage capacity of the second low-voltage storage battery 16. Further, when a positive determination is made in step S36, the vehicle running is stopped in step S38, thereby terminating the control process. Hence, the second low-voltage storage battery 16 is unlikely to enter an over discharging state when an abnormality occurs in the first route ES1.

By contrast, when a determination in step S36 is negative, it is further determined in step S40 whether a switching instruction of switching a mode to the second mode is input from a driver via the input section 46. That is, it is determined whether the driver has responded in accordance with the notification. When the determination in step S40 is negative, the control process is terminated, and the vehicle is continuously driven in the first mode by using one of the loads 34 and 36 in one of the routes where no abnormality has occurred.

By contrast, when a positive determination is made in step S40, a driving mode of the vehicle is switched from the first mode to the second mode in step S42, thereby terminating the control process. In such a situation, even if the mode is switched to the second mode, since it has been already determined that the abnormality has occurred in any one the routes ES1 and ES2, a switch-on command is not output to the third switch SW3.

Further, in steps S50 and S52, it is determined if an abnormality has occurred in one of the first route ES1 and the second route ES2 when the vehicle is in the second mode. Specifically, in step S50, it is determined whether an abnormality has occurred in the first route ES1. When the determination in step S50 is negative, it is then determined in step S52 whether an abnormality has occurred in the second route ES2. Hence, according to this embodiment, each of the processes performed in steps S22, S24, S50 and S52 corresponds to an abnormality determiner in this embodiment.

Further, when it is determined that no abnormality has occurred in each of the routes ES1 and ES2, a negative determination is made in step S52. In such a situation, the control process is terminated, and the vehicle is continuously driven in the second mode.

By contrast, when it is determined that an abnormality has occurred in any one of the routes ES1 and ES2, a switch-off command is output to each of the first to third switches SW1 to SW3, and power is stopped supplying to one of the routes where the abnormality has occurred. Specifically, when the determination in step S50 is positive, a switch-off command is initially output to each of the first to third switches SW1 to SW3 in step S54. Subsequently, in step S56, a command of switching a state of the converter 12 to an operation stop state is output.

Further, when a positive determination is made in step S52, a switch-off command is initially output to each of the first to third switches SW1 to SW3 in step S58. Subsequently, in step S60, a switch-off command is output to each of the fourth switch SW4 and the fifth switch SW5. Hence, according to this embodiment, each of the processes performed in steps S26, S30, S54 and S58 corresponds to a state controller in this embodiment.

Subsequently, in step S62, the driver receives a notification that an abnormality has occurred in any one of the first route ES1 and the second route ES2 via the notification section 44, and the control process is thereby terminated.

Next, the control process will be herein below described based on a time chart with reference to FIG. 3. FIG. 3 illustrates respective transitions of a first voltage VA and a second voltage VB caused when a vehicle is running in the first mode and a ground fault occurs in the second route ES2. Here, the first voltage VA is a voltage applied to the first load 34 of the first route ES1. The second voltage VB is a voltage applied to the second load 36 of the second route ES2.

Figure 3:
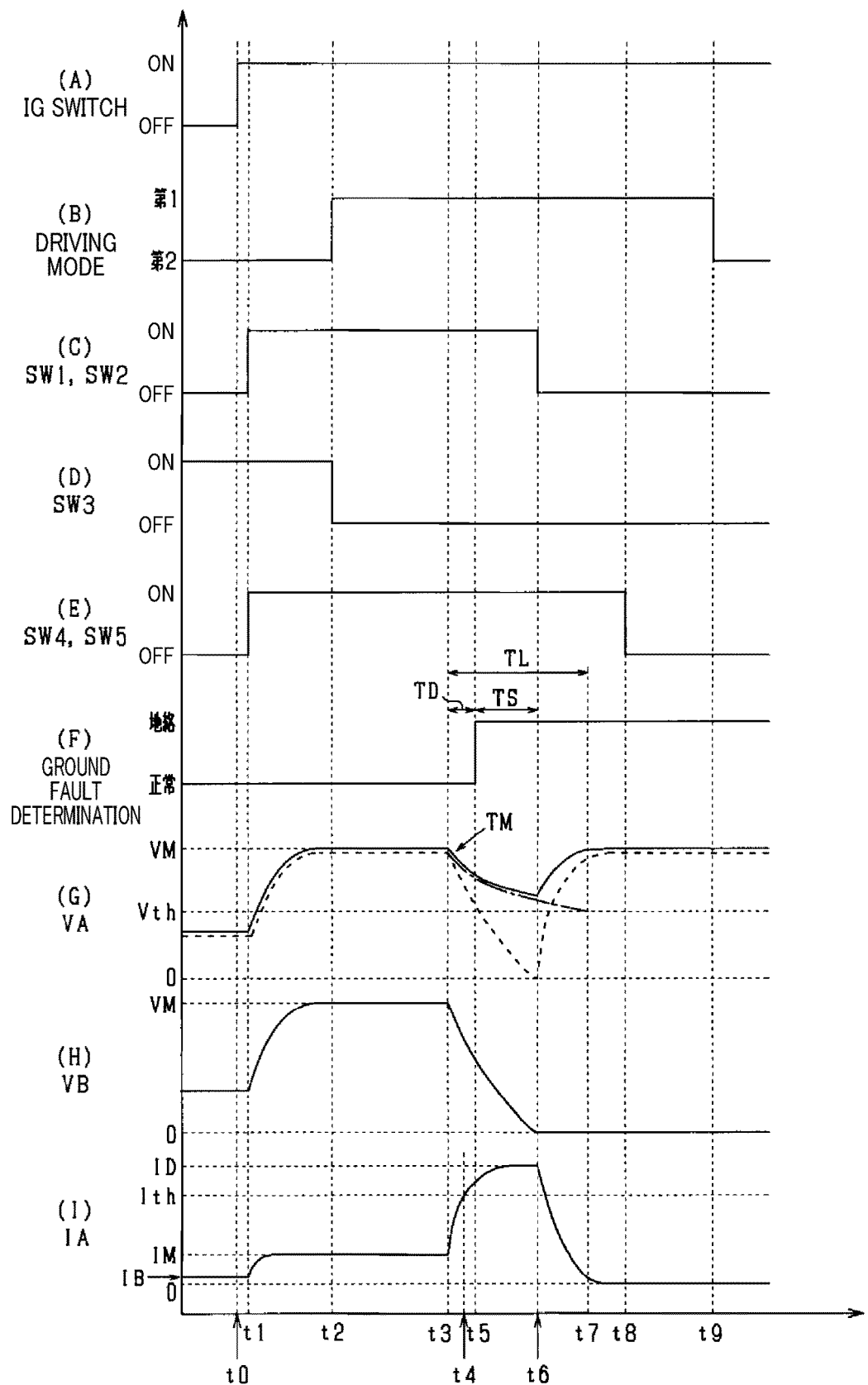
FIG. 3 is a time chart illustrating an exemplary control process according to one embodiment of the present disclosure.

Specifically, in FIG. 3, a chart A illustrates transition of a state of the IG switch 45. A chart B also illustrates transition of a driving mode of a vehicle. A chart C illustrates transition of an on-off state of each of the first and second switches SW1 and SW2. A chart D also illustrates transition of an on-off state of the third switch SW3. A chart E also illustrates transition of an on-off state of each of the fourth switch SW4 and fifth switch SW5. Further, a chart F illustrates transition of a determination result of a ground fault. A chart G illustrates transition of the first voltage VA. A chart H illustrates transition of the second voltage VB. A chart I illustrates transition of an inter-route current IA.

More specifically, in the chart G of FIG. 3, a solid line indicates transition of the first voltage VA generated in this embodiment in which a reactor 38 is disposed in the first connection path LB1. Also, in the chart G, a broken line indicates transition of a first voltage VA of a comparative example in which a reactor 38 is not disposed in a first connection path LB1. Again, in the chart G, a one-dot chain line indicates decreasing transition of a first voltage VA when a ground fault occurs in the second route ES2 according to one embodiment of the present disclosure.

Further, as shown in charts A and D of FIG. 3, during an off period of the IG switch 45 ending at time t1 (i.e., in a suspended state of the power supply system 100), the third switch SW3 is in a switched-on state. Hence, during the off period of the IG switch 45, the third switch SW3 allows the first low-voltage storage battery 14 to supply a dark current D3 to the second route ES2. Further, during the off period of the IG switch 45, the first, second, fourth and fifth switches SW1, SW2, SW4 and SW5 are switched off, and a state of the converter 12 is switched to an operation stop state.

When the IG switch 45 is switched on at time t0, a switch-on command is output to each of the first, second, fourth and fifth switches SW1, SW2, SW4 and SW5, and a given command is output to the converter 12 to switch a state thereof to an operating state. As a result, at time t1, each of the first and second switches SW1 and SW2 is brought to a switched-on state, and a second mode is designated as a driving mode of the vehicle. That is, in the second mode, the first to third switches SW1 to SW3 are switched on.

At the same time, each of the fourth switch SW4 and the fifth switch SW5 is brought into an on-state, and a state of the converter 12 is switched to an operating state. As a result, each of the first voltage VA and the second voltage VB rises to an operating voltage VM, so that an inter-route current IA increases to a given operating current IM. In the second mode, since the third switch SW3 is switched on, the inter-route current IA flows through the second connection path LB2. Hence, a delay in rise of each of the first voltage VA and the second voltage VB generally caused by the inductance component ZB of the reactor 38 disposed in the first connection path LB1 may be reduced or suppressed.

Subsequently, when a switching instruction of switching a mode to the first mode is input from the driver via the input section 46, a switch-on command is output to the third switch SW3. Then, the third switch SW3 is switched off at time t2, and a driving mode of the vehicle is switched from the second mode to the first mode. That is, in the first mode, each of the first and second switches SW1 and SW2 is in the switched-on state, and the third switch SW3 is in the switched-off state.

Further, it is determined if a ground fault has occurred in any one of the first route ES1 and the second route ES2 during running of a vehicle in the first mode. When it is determined that no ground fault has occurred in each of the routes ES1 and ES2, each of the first and second switches SW1 and SW2 remains in the switched-on state. With this, power is supplied from the converter 12 and the first and second low-voltage storage batteries 14 and 16 to the first and second loads 34 and 36. Specifically, power can be continuously supplied from the converter 12 during autonomous driving performed long time. At the same time, power can be supplied with low voltage fluctuation due to power supply from each of the first and second low-voltage storage batteries 14 and 16. As a result, during the period from time t2 to time t3, autonomous driving and driver assistance are performed by using the first load 34 and the second load 36.

By contrast, when it is determined that a ground fault has occurred in any one of the routes ES1 and ES2, a state of each of the first and second switches SW1 and SW2 is switched to a switched off state as described below. That is, it is assumed in this embodiment that a ground fault occurs in the second route ES2 at time t3. As a result, the first voltage VA and the second voltage VB decrease. Further, an amount of current detected by the first current detector 26 increases to an amount of a ground current ID.

Specifically, as shown by a solid line in the chart I of FIG. 3, when the ground fault occurs in the second route ES2 at time t3, the inter-route current IA rises to greater than an upper limit value Ith of a normal current range at time t4. However, since a control process is performed per control cycle, the controller 40 determines at time t5 coming after time t4 that the inter-route current IA becomes greater than the upper limit Ith of the normal current range, that is, the ground fault has occurred. Then, at time t5, a switch-off command is output to each of the first and second switches SW1 and SW2. Hence, a period from time t3 to time t5 corresponds to a determination period TD in this embodiment in this embodiment.

Subsequently, each of the first and second switches SW1 and SW2 enters a switch off state at time t6. Here, a period from time t5 to time t6 is determined based on a switching speed at which each of the first and second switches SW1 and SW2 is switched. Hence, the period from time t5 to time t6 corresponds to a shut-off period TS in this embodiment in this embodiment. As a result, the amount of current detected by the first current detector 26 decreases to zero, and the first voltage VA stops decreasing. That is, due to the ground fault in the second route ES2, the first voltage VA decreases over the period from time t3 to time t5.

Further, as shown by the broken line in the chart G of FIG. 3, if the reactor 38 is not disposed in the first connection path LB1, the first voltage VA decreases in accordance with a time constant determined based on an inductance component ZA1 included in the first route ES1. Since the inductance component ZA1 of the first route ES1 is relatively small, the time constant identified by the inductance component ZA1 of the first route ES1 is accordingly relatively small. Hence, as shown in the charts G and H, the first voltage VA decreases substantially at the same speed as the second voltage VB does and decreases to less than a lower limit Vth of the operating voltage VM during the shut-off period TS. As a result, operation of the first load 34 is interrupted after the end of the shut-off period TS until a time the first voltage VA rises more the lower limit Vth of the operating voltage VM. Accordingly, when a vehicle is autonomously driven and the above-described interruption occurs during the first mode, since a driver cannot control the vehicle, driving safety is not secured at the time.

In view of this, according to this embodiment, the reactor 38 is disposed in the first connection path LB1. Specifically, the first voltage VA is controlled to decrease lower than the lower limit Vth of the operating voltage VM at time t7 after a time the shut-off period TS has elapsed (see single-dot chain line in the chart G of FIG. 3) due to a time constant TM specified by the inductance component ZA1 of the first route ES1 and the inductance component ZB of the reactor 38. With this, even if a ground fault occurs in the second route ES2, the first voltage VA can remain higher than the lower limit Vth of the operating voltage VM, thereby continuously operating the first load 34. Hence, a period from time t3 to time t7 corresponds to a decreasing period TL in this embodiment.

Subsequently, the fourth switch SW4 and the fifth switch SW5 are switched off at time t8. With this, over discharging of the second low-voltage storage battery 16 may be reduced or suppressed. Then, when a switching instruction is input from the driver via the input section 46, a driving mode of the vehicle is switched from the first mode to the second mode at time t9.

As described heretofore, according to one embodiment of the present disclosure, the blow-described advantages can be obtained.

Specifically, in one embodiment of the present disclosure, the first and second switches SW1 and SW2 are disposed in the first connection path LB1 connecting the first and second routes ES1 and ES2 with each other. Hence, power can be mutually supplied between the first and second routes ES1 and ES2 by switching on the first and second switches SW1 and SW2, thereby redundantly supplying surplus power from the converters 12 and the first and second low-voltage storage batteries 14 and 16 to the first load 34 and the second load 36. Further, even when it is determined that an abnormality has occurred in one of the routes ES1 and ES2, one of the loads 34 and 36 disposed in the other one of the routes ES1 and ES2 where the abnormality has not occurred can be continuously operated by switching off each of the first and second switches SW1 and SW2.

More specifically, in the first connection path LB1, the reactor 38 is connected in series to the first and second switches SW1 and SW2. Then, with the inductance component ZB of the reactor 38, the time constant TM of a circuit composed of the other one of the routes ES1 and ES2 (where the abnormality does not occur) and the first connection path LB1 is determined to be a level enabling one of the voltages VA and VB of applicable one of the loads 34 and 36 in the other one of the routes ES1 and ES2 not to decrease lower than the lower limit Vth of the operating voltage VM during the shut-off period TS. That is, even if an abnormality occurs in one of the routes ES1 and ES2, a transitory voltage difference is generated between these routes ES1 and ES2 based on a transitory change in current generated by the abnormality and the inductance component ZB of the reactor 38. Then, with the transitory voltage difference, one of the voltages VA and VB of applicable one of the loads 34 and 36 in the other one of the routes ES1 and ES2 (where no abnormality occurs) is rendered not to decrease to less than the lower limit Vth of the operating voltage VM. With this, the other one of the loads 34 and 36 in the other one of the routes ES1 and ES2 can be continuously operated.

That is, in general, by disposing a resistor having a given resistance value in the first connection path LB1, for example, a transitory voltage difference can be generated based on a transitory change in current generated by the abnormality and the resistance value of the resistor. However, when the resistor is disposed in the first connection path LB1, a voltage difference is always generated between the routes, thereby losing power even in a normal time when an abnormality does not occur. In the above-described system, however, by disposing the reactor 38 in the first connection path LB1, generation of a voltage difference between the routes and power loss can be reduced or suppressed during normal operation.

Further, in another embodiment of the present disclosure, the second connection path LB2 is disposed between the first and second routes ES1 and ES2 to connect the first and second routes ES1 and ES2 with each other by bypassing the reactor 38, and a third switch SW3 is disposed in the second connection path LB2. Hence, the first and second routes ES1 and ES2 are connected with each other by switching on the third switch SW3 without intervention of the rector 38. With this, when power is mutually supplied between the first and second routes ES1 and ES2 during a normal time when no abnormality occurs, a delay in voltage fluctuation in each of the loads 34 and 36b caused by the inductance component ZB of the rector 38 can be reduced or suppressed.

In yet another embodiment of the present disclosure, the first load 34 and the second load 36 act as functions necessary for running a vehicle and perform a driving assistance function. Further, a mode of driving is switched between a first mode in which a driver assistance function is used and a second mode in which the driver assistance function is not used. In this embodiment, a switch-on command is output to each of the first and second switches SW1 and SW2, while a switch-off command is output to the third switch SW3 in the first mode. With this, the first route ES1 and the second route ES2 can be connected with each other via the reactor 38, and power can be secured in any one of the routes ES1 and ES2 in which an abnormality has not occurred, thereby enabling continuous usage of the driver assistance function even if the abnormality occurs in the other one of the routes ES1 and ES2.

Further, in the second mode, a switch-on command is output to each of the first, second and third switches SW1, SW2 and SW3, thereby electrically connecting the first route ES1 and the second route ES2 with each other via the second connection path LB2. With this, the first route ES1 and the second route ES2 can be connected without intervention of the reactor 38, thereby enabling reduction or suppression of a delay in voltage fluctuation in each of the loads 34 and 36 during a normal time when no abnormality has occurred. That is, an operation delay in the second mode can be reduced or suppressed while preventing the first mode from losing power.

In yet another embodiment of the present disclosure, the first route ES1 and the second route ES2 are electrically connected with each other by bypassing the reactor 38 in the second mode. Hence, when it is determined that an abnormality has occurred in the second mode and a switch-off command is accordingly output to the first, second and third switches SW1, SW2 and SW3, one of the voltages VA and VB of the applicable one the loads 34 and 36 in the other one of the routes unavoidably decreases to lower than the lower limit value Vth of the operating voltage VM during the shut-off period TS. However, in the above-described system of the present disclosure, the driver assistance function is not used in the second mode. Hence, when one of the voltages VA and VB of one of the loads 34 and 36 in the other one of the routes ES1 and ES2 decreases below the lower limit Vth of the operating voltage VM during the shut-off period TS, a vehicle can be continuously run by a driver who drives the vehicle. In addition, after the shut-off period TS has elapsed, the vehicle can continuously run by using one of the loads 34 and 36 in the other one of the routes ES1 and ES2 where no abnormality has occurred.

In yet another embodiment of the present disclosure, the third switch SW3 remains in an on-state, thereby enabling a dark current IB to be supplied to the second route ES2 when the power supply system 100 is in a halting state (system halt). In addition, in the operating state of the power supply system 100, the third switch SW3 connects the first and second routes ES1 and ES2 with each other by using the second connection path LB2, through which the dark current IB is supplied by bypassing the rector 38. Hence, since a special path for connecting the first and second routes ES1 and ES2 with each other by bypassing the reactor 38 is not needed separately from a path for allowing the dark current IB to be supplied, a configuration of the power supply system 100 can be simplified.

The present disclosure is not limited to the above-described embodiments and may include various modifications thereof as described herein below.

First, the moving body is not limited to vehicles and may include ships and aerial vehicles, for example.

Further, each of the loads 34 and 36 may include the below described devices, for example.

That is, each of the loads 34 and 36 may be a driving motor and a drive circuit driving the driving motor to collectively provide a driving force to an engine. In such a situation, each of the first and second loads 34 and 36 includes, for example, a three-phase permanent magnet synchronous motor and a three-phase inverter, respectively.

Further, each of the loads 34 and 36 may be an anti-lock brake that prevents a wheel from being locked during braking. In such a situation, each of the first and second loads 34 and 36 includes, for example, an ABS (Anti-skid Braking System) actuator capable of separately adjusting a hydraulic braking pressure during braking.

Further, each of the loads 34 and 36 may be a cruise controller that detects a front running vehicle running ahead of an own vehicle and maintains a constant vehicular gap therebetween when the front running vehicle is detected. The cruise controller can be a type that runs the own vehicle at a given vehicle speed when the front-running vehicle is no longer detected. In such a situation, each of the first and second loads 34 and 36 may include a millimeter wave radar, for example.

Further, the loads 34 and 36 are not necessarily a combination of the same or similar devices, and may be another combination realized by different types of devices having substantially the same function.

Further, the first and second switches SW1 and SW2 are not limited to the MOSFETs and may be IGBTs (Insulated Gate Bipolar Transistors), for example. The fourth and fifth switches SW4 and SW5 may also be the IGBTs.

Figure 4:
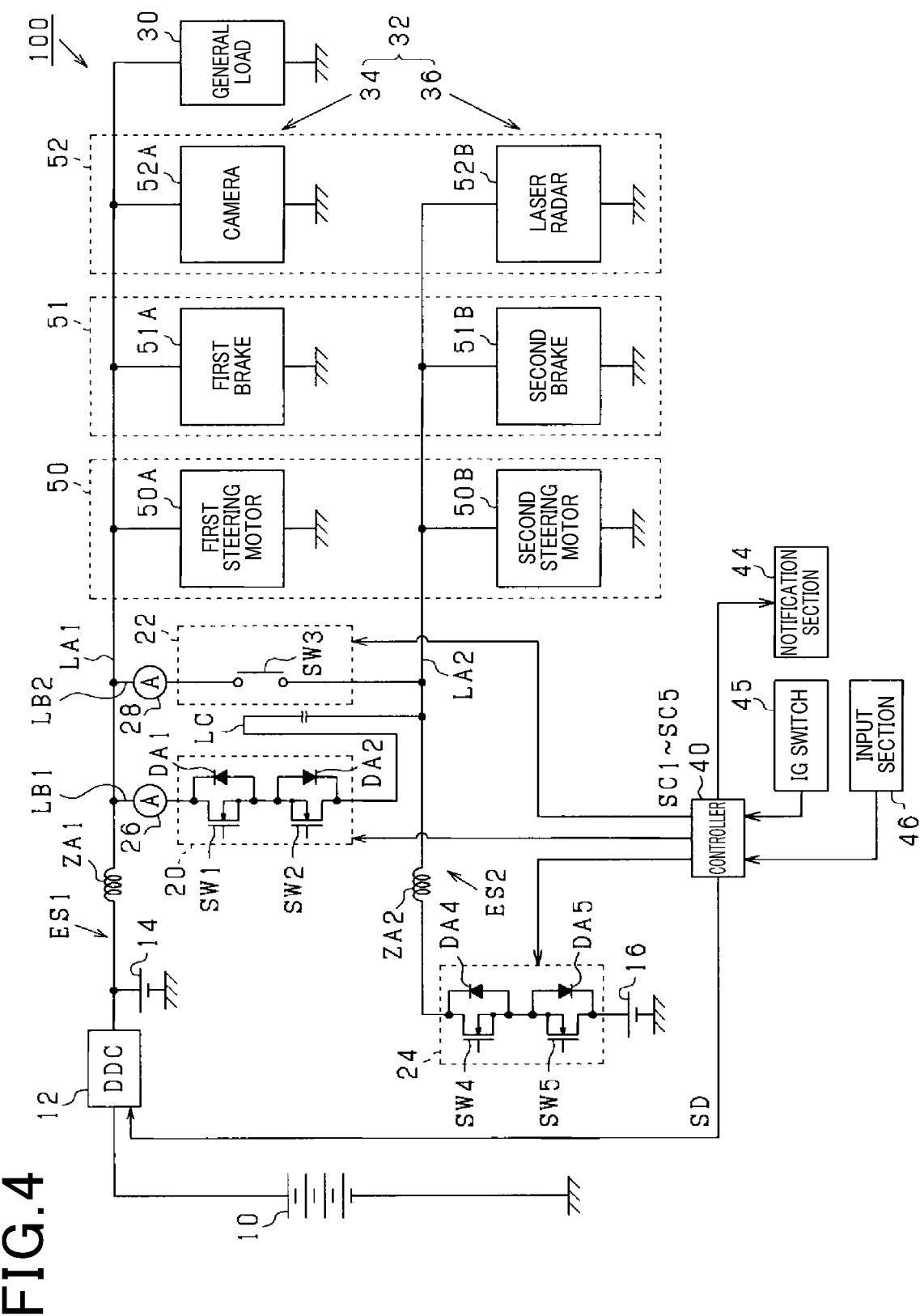
FIG. 4 is a diagram illustrating an overall structure of a power supply system according to another embodiment of the present disclosure.

Further, the inductance disposed in the first connection path LB1 is not limited to the reactor 38. That is, the first connection path LB1 may be extended as shown in FIG. 4. In such a situation, the reactor 38 is no longer needed, and the inductance is constituted by an extension LC of the first connection path LB1. Hence, the inductance component corresponds to an inductance component of the extension LC.

Further, the second connection path LB2 may optionally bypass only the reactor 38. That is, one end of the second connection path LB2 may be connected to an intermediate point in the first connection path LB1 between the first switch unit 20 and the reactor 38, and the other end of the second connection path LB2 may be connected to an intermediate point in the first connection path LB1 between the reactor 38 and the second route inner path LA2. With this, the second switch unit 22 and the reactor 38 are connected in parallel with each other, while the first switch unit 20 and the second switch unit 22 are connected in series with each other. In such a situation, when each of the first to third switches SW1 to SW3 is brought to an on-state, the first route ES1 and the second route ES2 are electrically connected.

Further, in the power supply system 100, the first current detector 26 and the controller 40 may be integrated. With this, an acquisition period needed when the controller 40 acquires an inter-route current IA, and accordingly, the determination period TD can be shortened. Further, the second low-voltage storage battery 16, the first switch unit 20, the third switch unit 24, and the reactor 38 can be an all-in-one structure (i.e., integrated). With this, the inductance component ZA2 of the second route ES2 can be reduced, and the inductance component ZB of the reactor 38 can be easily designated.

Figure 5:
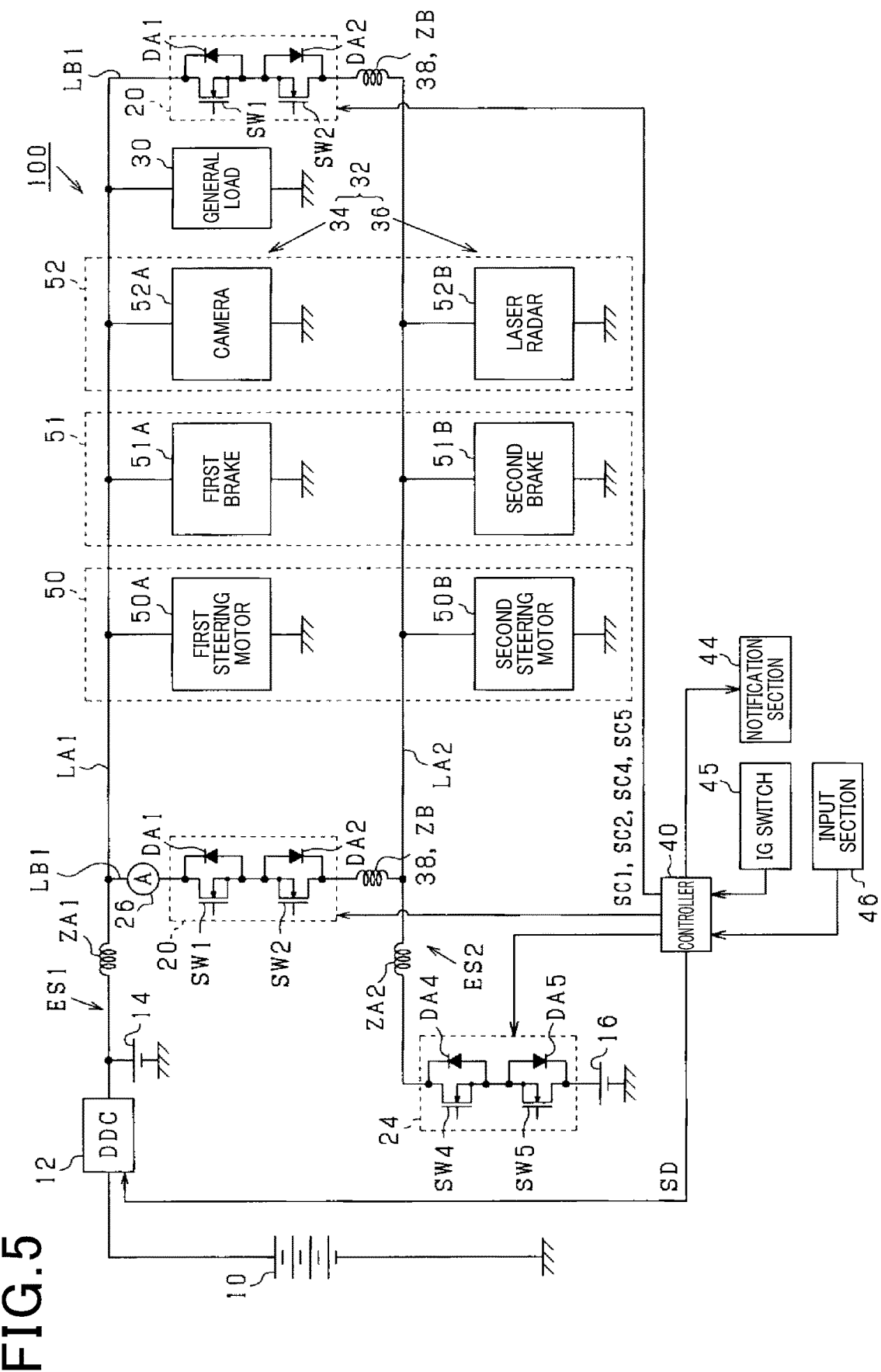
FIG. 5 is a diagram illustrating an overall structure of a power supply system according to yet another embodiment of the present disclosure.

Further, in the above-described embodiment, a single first connection path LB1 and a single second connection path LB2 are disposed as one example, but the present disclosure is not limited thereto. That is, as shown in FIG. 5, two first connection paths LB1 may be disposed, and a second connection path LB2 can be omitted. In such a situation, these two first connection paths LB1 and the first and second inter-route paths LA1 and LA 2 may be connected in an annular state.

Figure 6:
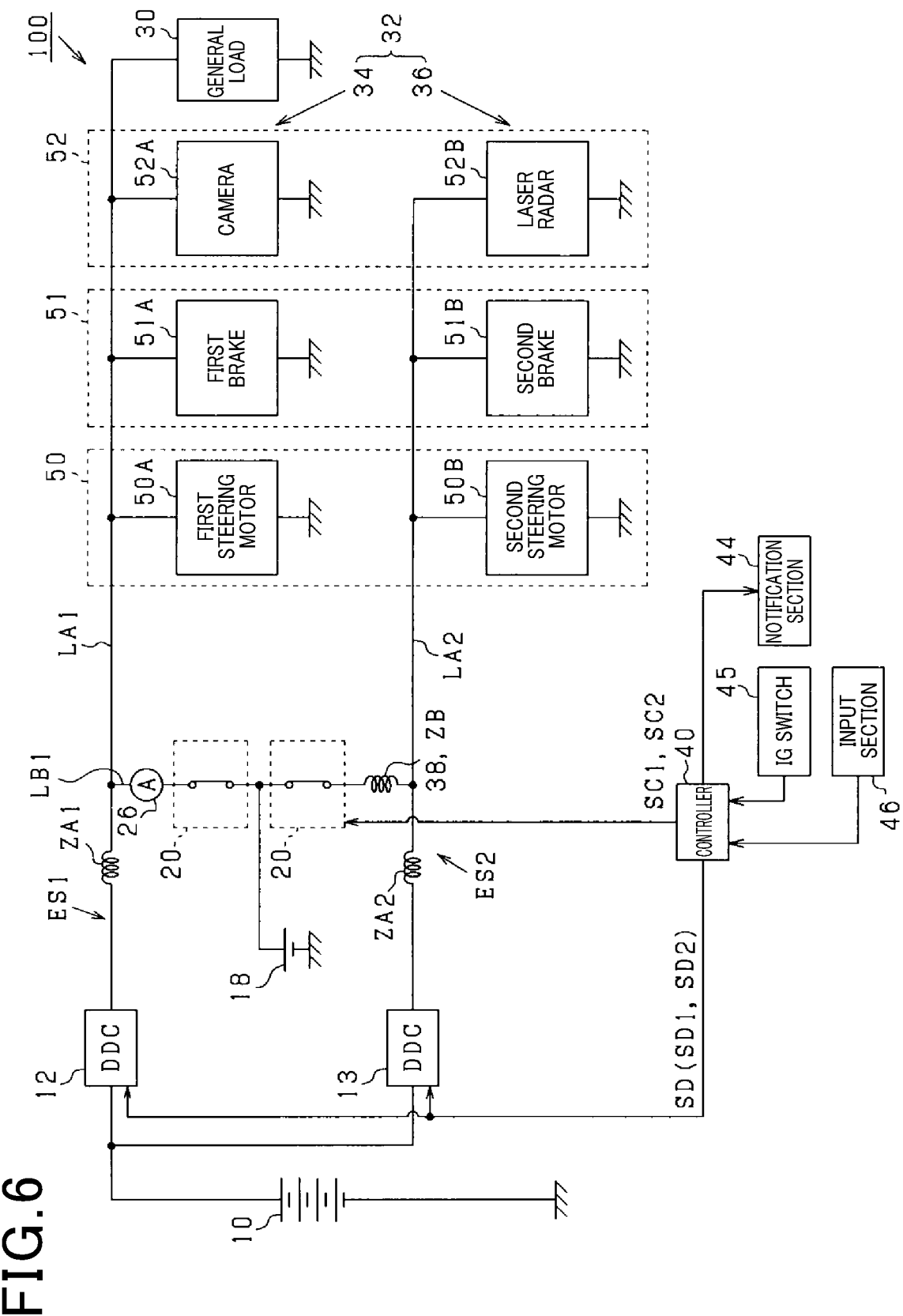
FIG. 6 is a diagram illustrating an overall structure of a power supply system according to yet another embodiment of the present disclosure.

Further, as shown in FIG. 6, a single first connection path LB1 can be disposed while a second connection path LB2 is omitted. In such a situation, two first switch units 20 are disposed in the first connection path LB1, and a third low-voltage storage battery 18 is disposed instead of the first low-voltage storage battery 14 and the second low-voltage storage battery 16. Then, the third low-voltage storage battery 18 is connected to a portion between these two first switch units 20. With this, the number of low-voltage storage devices included in the power supply system 100 can be reduced, thereby enabling reduction of cost for manufacturing the power supply system 100. In such a situation, a converter 13 is desirably disposed in a second route ES2.

Further, in the above-described embodiment, the power supply system 100 is employed in the vehicle both manually and autonomously driven as one example. However, the present disclosure is not limited thereto and the power supply system 100 may be employed only in a vehicle which is autonomously driven, such as a fully autonomous vehicle, etc. Similarly, the power supply system 100 may be employed only in a vehicle only driven manually.

Specifically, when the power supply system 100 is employed, for example, in a vehicle only running based on autonomous driving and an abnormality occurs in one of the routes ES1 and ES2, the vehicle can be stopped either immediately or after it is moved to a safe place by using one of the loads 34 and 36 of applicable one of the routes ES1 and ES2 in which an abnormality does not occur.

Further, in the above-described embodiment, when it is determined that an abnormality has occurred in one of the routes ES1 and ES2, power supply is stopped to the applicable one of the routes ES1 and ES2 where the abnormality has occurred as one example. However, the present disclosure is not limited thereto, and a reduced amount of power can be continuously supplied to the one of the routes ES1 and ES2 where the abnormality has occurred.

Further, a detection method of detecting an abnormality is not limited to the above-described detection method that detects the abnormality based on a current. For example, the abnormality may be detected based on a voltage.

Numerous additional modifications and variations of the present disclosure are possible in light of the above teachings. It is therefore to be understood that within the scope of the appended claims, the present disclosure may be performed otherwise than as specifically described herein. For example, the present disclosure is not limited to the above-described power supply system and may be altered as appropriate.

What is claimed is:

1. A power supply system comprising:
a first route including a first power supply connected to a first load;
a second route including a second power supply connected to a second load;
a connection path connecting the first and second routes with each other, the connection path including:
  a first inter-route switch disposed in the connection path, and
  an inductance having a given inductance component connected in series to the first inter-route switch;
an abnormality determiner to determine if an abnormality has occurred in any one of the first route and the second route; and
a state controller to output a switch-off command to the first inter-route switch when it is determined by the abnormality determiner that an abnormality has occurred,
wherein the inductance component has a given value causing a time constant of a circuit composed of one of the first route and the second route in which the abnormality does not occur and the connection path not to allow a voltage of one of the first load and the second load disposed in the other one of the first route and the second route to decrease to less than a lower limit of an operating voltage of the one of the first load and the second load during a shut-off period, and
wherein the shut-off period starts from a time when it is determined by the abnormality determiner that an abnormality has occurred in any one of the first route and the second route to a time when the first inter-route switch enters a switched off state upon receiving the switch-off command from the state controller.

2. The power supply system as claimed in claim 1, further comprising:
a bypass path connecting the first and second routes with each other to bypass the inductance, the bypass path including a second inter-route switch.

3. The power supply system as claimed in claim 2, wherein the first load and the second load perform at least one common driver assistance function of assisting a moving body necessary for operation of the moving body,
wherein the moving body is enabled to run in a first mode by using the driving assistance function and a second mode without using the driving assistance function,
wherein the state controller outputs a switch-on command to the first inter-route switch and a switch-off command to the second inter-route switch in the first mode, and
wherein the state controller outputs a switch-on command to at least the second inter-route switch and allows the first route and the second route to have electrical continuity to each other through the bypass path in the second mode.

4. The power supply system as claimed in claim 3, wherein the state controller outputs a switch-off command to the first inter-route switch when it is determined by the abnormality determiner that an abnormality has occurred in the first mode.

5. The power supply system as claimed in claim 3, wherein the state controller outputs a switch-off command to the first inter-route switch and the second inter-route switch when it is determined by the abnormality determiner that an abnormality has occurred in the second mode.

6. The power supply system as claimed in claim 2, wherein the bypass path bypasses the first inter-route switch and the inductance and allows a dark current to be supplied to the second route via the second inter-route switch when the power supply system is in a hibernation state.

* * * * *